United States Patent
Wu et al.

(10) Patent No.: US 7,946,129 B2
(45) Date of Patent: May 24, 2011

(54) REDUCING CROWN CORROSION IN A GLASSMELTING FURNACE

(75) Inventors: Kuang-Tsai Wu, Williamsville, NY (US); Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 821 days.

(21) Appl. No.: 11/938,829

(22) Filed: Nov. 13, 2007

(65) Prior Publication Data

US 2008/0115535 A1   May 22, 2008

Related U.S. Application Data

(60) Provisional application No. 60/859,783, filed on Nov. 17, 2006, provisional application No. 60/859,784, filed on Nov. 17, 2006, provisional application No. 60/859,785, filed on Nov. 17, 2006, provisional application No. 60/859,786, filed on Nov. 17, 2006.

(51) Int. Cl.
*C03B 5/00* (2006.01)
*C03B 5/167* (2006.01)
*C03B 5/42* (2006.01)
*C03B 5/16* (2006.01)

(52) U.S. Cl. ............ 65/134.4; 65/134.6; 65/134.1; 65/157; 65/347

(58) Field of Classification Search ........... 65/134.4, 65/134.6, 134.1
See application file for complete search history.

(56) References Cited

U.S. PATENT DOCUMENTS

| | | | | |
|---|---|---|---|---|
| 2,198,745 | A * | 4/1940 | Smith | 65/27 |
| 3,165,301 | A * | 1/1965 | Riviere | 432/4 |
| 3,238,030 | A * | 3/1966 | O'Connell et al. | 65/27 |
| 3,240,581 | A * | 3/1966 | O'Connell et al. | 65/27 |
| 3,523,781 | A * | 8/1970 | Leveque | 65/135.1 |
| 3,734,701 | A * | 5/1973 | Pecoraro et al. | 65/27 |
| 3,811,854 | A * | 5/1974 | Pecoraro | 65/27 |
| 3,837,832 | A * | 9/1974 | Pecoraro et al. | 65/182.1 |
| 4,675,041 | A * | 6/1987 | Tsai | 65/27 |
| 5,586,999 | A * | 12/1996 | Kobayashi | 65/134.3 |
| 5,628,809 | A * | 5/1997 | Kobayashi | 65/134.4 |
| 5,795,363 | A * | 8/1998 | Pecoraro et al. | 65/134.4 |
| 5,961,689 | A * | 10/1999 | Kobayashi et al. | 75/414 |
| 6,253,578 | B1 * | 7/2001 | Kobayashi et al. | 65/134.4 |
| 6,313,057 | B1 | 11/2001 | Brown et al. | |
| 6,422,041 | B1 | 7/2002 | Simpson et al. | |
| 6,519,973 | B1 | 2/2003 | Hoke, Jr. et al. | |
| 6,532,771 | B1 * | 3/2003 | Kobayashi et al. | 65/134.4 |
| 6,705,117 | B2 | 3/2004 | Simpson et al. | |
| 7,168,269 | B2 * | 1/2007 | Simpson et al. | 65/134.6 |

(Continued)

OTHER PUBLICATIONS

Beerkens, R.G.C., et al., "Reactions of Alkali Vapours With Silica Based Refractory in Glass Furnaces, Thermodynamics and Mass Transfer", Glass Technol., 46 (6), pp. 371-382 (2005).

*Primary Examiner* — Jason L. Lazorcik
(74) *Attorney, Agent, or Firm* — Donald T. Black (57) ABSTRACT

Corrosion of the inner surface of the crown of a glassmelting furnace is reduced or avoided by directing at low velocity along that surface a gaseous stream comprising water vapor, or comprising the combustion products of an oxy-fuel burner operated at a stoichiometric ratio of at least 1.0, or the combustion products of a burner operated at a stoichiometric ratio less than 1.0, or by injecting into the furnace interior a gaseous reactant which reacts with alkali species in said space.

6 Claims, 5 Drawing Sheets

U.S. PATENT DOCUMENTS

| | | | |
|---|---|---|---|
| 7,409,838 B2 * | 8/2008 | Kobayashi | 65/134.4 |
| 7,669,439 B2 * | 3/2010 | Simpson et al. | 65/157 |
| 2004/0023790 A1 | 2/2004 | Dramais et al. | |
| 2006/0150677 A1 * | 7/2006 | Kobayashi | 65/27 |
| 2008/0115535 A1 * | 5/2008 | Wu et al. | 65/134.4 |

* cited by examiner

REDUCING CROWN CORROSION IN A GLASSMELTING FURNACE

This application claims priority from U.S. Provisional Application Ser. No. 60/859,783, filed Nov. 17, 2006, Ser. No. 60/859,784, filed Nov. 17, 2006, Ser. No. 60/859,785, filed Nov. 17, 2006, and 60/859,786, filed Nov. 17, 2006, the disclosures of which are hereby incorporated herein by reference in their entirety.

FIELD OF THE INVENTION

The present invention relates to glassmaking and more particularly to the furnaces that are employed in glassmaking.

BACKGROUND OF THE INVENTION

In the manufacture of glass, glassmaking materials are melted in a glassmelting furnace by heat provided from burners which combust fuel with oxygen. The fuel can be combusted with air as the source of the oxygen, or with a stream containing a higher oxygen content than that of air. The furnace must be manufactured of material that can withstand the very high temperatures that prevail within the furnace. The materials of construction often employed, which typically include silicas and related materials, are well known.

However, the conditions within the glassmelting furnace have been known to cause corrosion of the inner surfaces of the furnace, especially of the roof ("crown") over the glassmaking materials. The most widely used material for the crown is silica brick for soda-lime-silicate glass furnaces. Alkali vapors (mostly NaOH and KOH) generated from the glass batch material in the glassmelting furnace react with silica refractory brick and form over time a glassy silicate material on the inner surface of the crown. When a sufficient concentration of alkali oxides (mainly $Na_2O$ and $K_2O$) accumulates in the glassy silicate layer, the glassy material can become fluid enough to drip directly into the molten glass in the furnace or to run along the silica refractory surface and over other refractory surfaces in the furnace and dissolve or dislodge some of the refractory particles which fall into the molten glass. This corrosion is undesirable as it leads to a loss of material in the crown, which eventually leads to expensive repairs or replacement of the crown, and because the corrosion products have been known to fall into the glassmaking materials in the furnace and to cause defects in the glass product.

U.S. Pat. No. 3,238,030 and U.S. Pat. No. 3,240,581 teaches that the formation of the silicate layer on the crown surface is to be encouraged, evidently in the belief that the layer prevented other corrosion products from causing defects in the glass product.

U.S. Pat. No. 3,238,030 teaches that alkali compounds such as sodium sulfate that form in the glassmelting process should be permitted to reach the material on the crown surface, whereupon the sulfate is subjected to conditions that convert the sulfate to more silicate on the material on the crown surface. However, for reasons mentioned above, that silicate layer eventually becomes a source of defects in the glass product and a sign of corrosive damage to the crown.

U.S. Pat. No. 3,240,581 teaches the introduction into the glass furnace atmosphere of additional amounts of alkali (sodium) even beyond the amounts that are already in the glass furnace atmosphere from the glassmaking materials. Here, too, is a teaching that is now understood to lead to conditions at the crown surface that cause defects in the glass product and damage to the crown.

BRIEF SUMMARY OF THE INVENTION

One aspect of the present invention is a method of operating a glassmelting furnace, comprising (A) providing a glassmelting furnace having walls defining a chamber that encloses a bath comprising glassmaking materials, a crown over said bath, at least one glassmelting oxy-fuel burner through a wall to provide heat to said bath by combustion in a combustion zone that is located between said bath and said crown, wherein the atmosphere within said glassmelting furnace contains vapor-phase alkali species and the inner surface of said crown is susceptible to corrosion by reaction with said vapor-phase alkali species, and at least one injector through a wall of said furnace that is oriented to inject a gaseous stream comprising water vapor to flow along said inner surface of said crown between said combustion zone and said crown, and (B) combusting fuel and oxidant having an oxygen content higher than that of air at said at least one glassmelting burner to provide heat to said bath while injecting from said at least one injector a gaseous stream comprising water vapor, and passing said stream comprising water vapor along said inner surface of said crown at a low velocity to establish and maintain a gaseous layer of along said inner surface in which the concentration of water vapor at said inner surface of said crown is higher than the concentration of water vapor in the atmosphere at the surface of said bath.

Preferably, the stream comprising water vapor that is passed along the inner surface of the crown contains no alkali.

Another aspect of the present invention is a method of operating a glassmelting furnace, comprising (A) providing a glassmelting furnace having walls defining a chamber that encloses a bath comprising glassmaking materials, a crown over said bath, at least one glassmelting oxy-fuel burner through a wall to provide heat to said bath by combustion in a combustion zone that is located between said bath and said crown, wherein the atmosphere within said glassmelting furnace contains vapor-phase alkali species and the inner surface of said crown is susceptible to corrosion by reaction with said vapor-phase alkali species, and at least one auxiliary oxy-fuel burner through a wall of said furnace that produces a gaseous stream of combustion products comprising water vapor and that is oriented to feed said gaseous stream of combustion products to flow along said inner surface of said crown between said combustion zone and said crown, and (B) combusting fuel and oxidant having an oxygen content higher than that of air at said at least one glassmelting burner to provide heat to said bath while combusting fuel and oxidant having an oxygen content higher than that of air at said at least one auxiliary oxy-fuel burner at a stoichiometric ratio of at least 1.0 to produce a gaseous stream of combustion products comprising water vapor, and passing a stream comprising said combustion products along said inner surface of said crown at a low velocity to establish and maintain a layer of said combustion products along said inner surface in which the concentration of water vapor at said inner surface of said crown is higher than the concentration of water vapor in the atmosphere at the surface of said bath.

Preferably, the stream of combustion products passed along the inner surface of the crown contains no alkali.

Another aspect of the present invention is a method of operating a glassmelting furnace, comprising (A) providing a glassmelting furnace having walls defining a chamber that encloses a bath comprising glassmaking materials, a crown over said bath, at least one glassmelting oxy-fuel burner through a wall to provide heat to said bath by combustion in a combustion zone that is located between said bath and said crown, wherein the atmosphere within said glassmelting furnace contains vapor-phase alkali species and the inner surface of said crown is susceptible to corrosion by reaction with said vapor-phase alkali species, and at least one auxiliary burner through a wall of said furnace that produces a gaseous stream of combustion products and that is oriented to feed said gaseous stream of combustion products to flow along said inner surface of said crown between said combustion zone and said crown, and (B) combusting fuel and oxidant having an oxygen content higher than that of air at said at least one glassmelting burner at a stoichiometric ratio greater than 1.0 to provide heat to said bath, while combusting fuel and oxidant at said at least one auxiliary burner at a stoichiometric ratio of less than 1.0 to produce a gaseous stream of combustion products comprising carbon monoxide and containing no alkali, and passing said gaseous stream of combustion products along said inner surface of said crown to establish and maintain a layer of said combustion products flowing along said inner surface which interact with alkali species from said combustion zone which are thereby inhibited from reacting with said inner surface of said crown.

Yet another aspect of the present invention is a method of operating a glassmelting furnace, comprising (A) providing a glassmelting furnace having walls defining a chamber that encloses a bath comprising glassmaking materials, a crown over said bath, and at least one glassmelting oxy-fuel burner through a wall to provide heat to said bath by combustion in said chamber, wherein the atmosphere within said chamber contains vapor-phase alkali species and the inner surface of said crown is susceptible to corrosion by reaction with said vapor-phase alkali species, and (B) combusting fuel and oxidant having an oxygen content higher than that of air at said at least one glassmelting burner at a stoichiometric ratio greater than 1.0 to provide heat to said bath, while injecting into said chamber a gaseous reactant, containing no alkali, which reacts with alkali species in said chamber which are thereby inhibited from reacting with said inner surface of said crown.

The reactant is preferably injected through one or more glassmelting burners, and/or through at least one injector through a wall of said furnace As used herein, "glassmaking materials" comprise any of the following materials, and mixtures thereof: sand (mostly $SiO_2$), soda ash (mostly $Na_2CO_3$), limestone (mostly $CaCO_3$ and $MgCO_3$), feldspar, borax (hydrated sodium borate), other oxides, hydroxides and/or silicates of sodium and potassium, and glass (such as recycled solid pieces of glass) previously produced by melting and solidifying any of the foregoing. Glassmaking materials may also include functional additives such as batch oxidizers such as salt cake (calcium sulfate, $CaSO_4$) and/or niter (sodium nitrate, $NaNO_3$, and/or potassium nitrate, $KNO_3$).

As used herein, "alkali species" means chemical compounds containing sodium, potassium and/or lithium atoms, including but not limited to sodium hydroxide, potassium hydroxide, products formed by decomposition of sodium hydroxide or potassium hydroxide at temperatures greater than 1200° C., and mixtures thereof.

As used herein, "oxy-fuel burner" means a burner through which are fed fuel and oxidant having an oxygen content greater than the oxygen content of air, and preferably having an oxygen content of at least 50 volume percent and more preferably more than 90 volume percent.

As used herein, "oxy-fuel combustion" means combustion of fuel with oxidant having an oxygen content greater than the oxygen content of air, and preferably having an oxygen content of at least 50 volume percent and more preferably more than 90 volume percent.

As used herein, "alkali hydroxide" means material selected from the group consisting of sodium hydroxide, potassium hydroxide, and mixtures thereof.

As used herein, "stoichiometric ratio" means the ratio of oxygen present to the total amount of oxygen that would be necessary to convert fully all carbon, sulfur and hydrogen present to carbon dioxide, sulfur dioxide, and water.

DETAILED DESCRIPTION OF THE INVENTION

Figure 1:
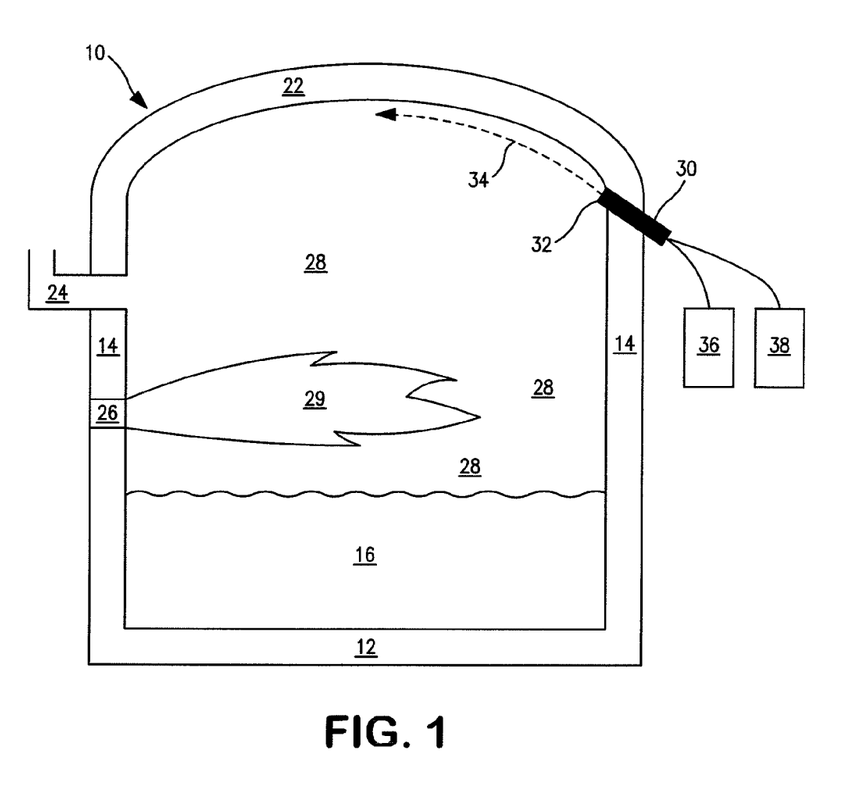
FIG. 1 is a cross-sectional view along the length of a glassmelting furnace in which the present invention can be practiced.

The invention is carried out in a glassmelting furnace 10 of any effective design. Typically the glassmelting furnace has a bottom 12 and walls 14 which define in the interior of the furnace a chamber for holding a bath 16 of glassmaking materials. Typically, at least a portion of the glassmaking materials in the bath are molten. That is, "glassmelting furnace" in which the present invention can be practiced includes apparatus in which glassmaking materials are melted, and includes apparatus (or sections of glassmelting apparatus, sometimes referred to as conditioning or refining zones) which holds already-molten glassmaking materials without necessarily performing any further melting.

The particular shape of the bottom is not critical, although in general practice it is preferred that at least a portion of the bottom is planar and is either horizontal or sloped in the direction of the flow of the molten glass through the furnace. All or a portion of the bottom can instead be curved. The particular shape of the furnace as defined by its walls is also not critical, so long as the walls are high enough to hold the desired amount of molten glass and to provide with the crown space above the molten glass in which the combustion can occur that melts the glassmaking materials and keeps them molten.

Figure 2:
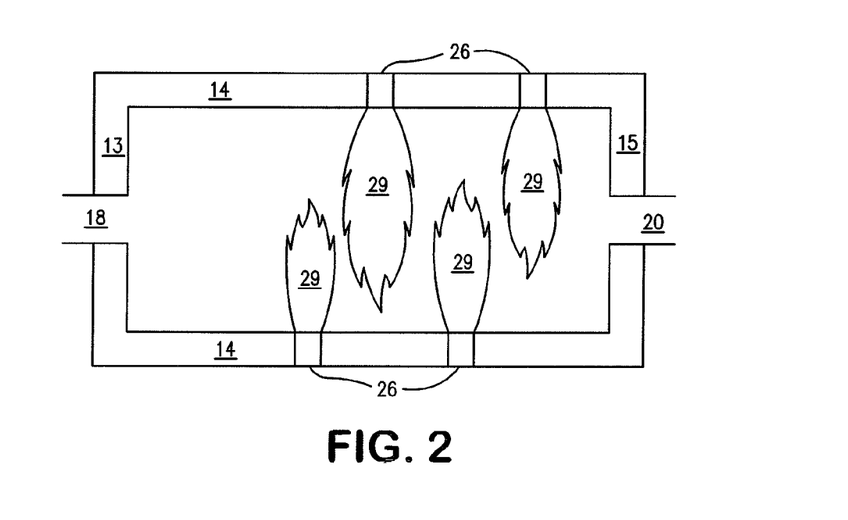
FIG. 2 is a top cross-sectional view of a glassmelting furnace in which the embodiments of the present invention can be practiced.

As seen better in FIG. 2, the furnace 10 also has an entrance 18, typically in a back wall 13 at an end of the furnace through which glassmaking materials or molten glass flows into the furnace, and an exit 20, typically in a front wall 15 at an end of the furnace opposite front wall 13 through which molten glass can flow out of the furnace. The furnace will also have side walls 14 and a roof, referred to herein as the crown 22. There are also one or more flues 24 through which products of the combustion of fuel and oxygen can flow out of the interior of the furnace. The flue or flues are typically located in back wall 13, or in one or more side walls.

The bottom, sides and crown of the furnace should be made from refractory material that can retain its solid structural integrity at the temperatures to which it will be exposed, i.e. typically 1300° C. to 1700° C. Such materials are widely known in the field of construction of high-temperature apparatus. Examples include silica, fused alumina, and AZS.

The inner surface of the crown, i.e. the surface that is in contact with the furnace atmosphere, may be comprised of the original material of construction of the crown, and in some places may instead comprise a layer of slag that has formed on what was the uncorroded surface of the crown. Such a slag layer may often be found in furnaces that have already been in use, particularly when such furnaces have been heated by oxy-fuel combustion. Typically, the slag layer contains silica, alkali oxide, alkaline earth oxide, and compounds thereof, such as contain calcium oxide and/or compounds of calcium oxide with silica and/or alkali oxide. Thus, the present invention can be carried out in furnaces in which the inner surface of the crown comprises corrosion product formed by reaction of the surface with alkali hydroxide, and in furnaces in which the inner surface of the crown does not comprise corrosion product formed by reaction of the surface with alkali hydroxide.

Referring again to FIG. 2, the glassmaking furnace 10 is also equipped with one or more glassmelting burners 26. Preferably, one or more of glassmelting burners 26 are oxy-fuel burners, that is, burners at which the combustion that occurs is oxy-fuel combustion. More preferably, for ease of construction, ease of operation and satisfactory control of the operations, all of the burners 26 are oxy-fuel burners. However, if desired, air-fired burners can be present as well.

Each glassmelting burner 26 is arranged so that oxidant and fuel are fed from suitable sources outside the furnace, into and through the burner so that fuel and oxidant emerge from the burner (separately or mixed) and combust in the interior of the furnace and generate heat to melt the glassmaking materials and maintain the glassmelt in the molten state.

The oxidant fed to the oxy-fuel burners is gaseous and should have a higher oxygen content than air, i.e. higher than 21 volume percent, but the preferred oxygen content of the oxidant is at least 50 volume percent and more preferably at least 90 volume percent. Thus, oxygen-enriched air can be employed as the oxidant, as can higher purity oxygen produced on site or purchased from a commercial supplier. The fuel fed to the burners should contain carbon, hydrocarbons or other compounds containing hydrogen and/or carbon. Suitable fuels include those conventionally used for these purposes such as natural gas, fuel oil, pulverized coal or petroleum coke. The stoichiometric ratio at these burners is preferably greater than 1.0, preferably 1.03 to 5; that is, there is preferably excess oxygen which may be present in the combustion zone atmosphere. This is attained in conventional manner, by adjusting the flow rate of the oxidant (taking into account its oxygen concentration) relative to the flow rate of the fuel (taking into account its content of combustible matter).

The glassmelting burners 26 are arranged so that the combustion of the fuel and oxidant fed to the burner occurs in a combustion zone 28 which includes flame(s) 29, in the interior of the furnace, above the surface of the bath 16 of melting or molten glassmaking materials and below crown 22. Typically the burners 26 can be located in one or more walls of the furnace (by which is meant side walls 14, back wall 13, and/or front wall 15). Burners 26 can be oriented so that the axes of the flames they support extend inward parallel to the surface of the molten glass, or so that the flames extend from the burner in a direction toward the surface of the molten glass. Combinations of different orientations can also be employed. Preferred examples include providing equal numbers of burners 26 in each of the side walls of a furnace, facing each other or staggered. The burners 26 can all be at the same height above the top surface of the bath 16, or the heights can be varied to provide a different distribution of the heat of combustion.

The glassmelting furnace can also include a section in which there is no glassmelting burner 26 above the bath, wherein the molten glass is maintained in the molten state by the heat within the chamber.

In the practice of one advantageous aspect of the present invention, one or more injectors are provided and used as described below. One such injector 30 is shown in FIG. 1, but more than one such injector 30 may be provided and employed depending on the size of the furnace 10. As shown in FIG. 1, injector 30 is located through a suitably dimensioned hole in a side wall 14. Injector 30 is oriented so that the gaseous stream that it injects from its end 32 flows along the inner surface of crown 22 that faces the interior of furnace 10 (as described above, the inner surface of the crown is considered to be the surface that is otherwise in contact with the furnace atmosphere, whether that surface is comprised of the original material from which the crown was constructed, or is comprised of slag such as is formed upon corrosion by interaction of the furnace atmosphere with the original material from which the inner surface of the crown is constructed). Each injector 30 is located high on a front, back, or side wall, near or at the intersection of the wall with the crown. Each injector 30 should be oriented so that the gaseous stream that emerges from end 32 flows parallel to the portion of the inner crown surface that is closest to the end 32. The flow of the gaseous stream from injector 30 is depicted in FIG. 1 as arrow 34. The gaseous stream thus passes between combustion zone 28 and crown 22. Each injector 30, or at least the portions thereof that are exposed to the high temperatures prevailing within furnace 10, must be made of material that can withstand exposure to such temperatures. Ceramic and high-temperature steel are examples of suitable material. Preferably, the injector 30 has a discharge end 32 which is configured, or contains a nozzle that is configured, so that the gaseous stream is discharged in a wide, flat pattern, the better to provide flow of the stream along more of the inner surface of the crown.

The gaseous stream injected from injector 30 comprises water vapor, i.e. steam. The stream may comprise 100 vol. % water vapor, but it can have any water vapor concentration less than 100 vol. % such as at least 25 vol. 5, at least 50 vol. %, and even at least 75 vol. %, so long as the water vapor concentration in the layer at the inner surface of the crown is higher than the water vapor concentration in the atmosphere at the surface of the molten glass bath. Thus, water vapor from a suitable source 36 such as a steam generator, optionally combined with one or more other gaseous components represented by source 38, is fed to each of the one or more injectors 30 employed in the practice of this invention.

The stream is emitted from injector 30 as a gaseous stream at a low velocity, effective to establish and maintain a layer having the desired high water vapor content as described herein at the inner surface of the crown and permitting the water vapor in that layer to establish the desired equilibrium conditions at the inner surface of the crown. This is quite different from prior art techniques that direct a stream to flow toward the crown surface and to impinge on that surface or on material that is present on that surface. This is also quite different from prior art techniques employing so-called "purge burners" which eject high velocity streams along the crown surface to purge or sweep potentially corrosive gases from reaching the crown surface. That high velocity minimizes or prevents chemical interaction of the crown surface with the streams from the purge burners, whereas the present invention relies on interaction of the crown surface with the combustion products from the injector 30 and requires low velocity to help attain that interaction.

Figure 3:
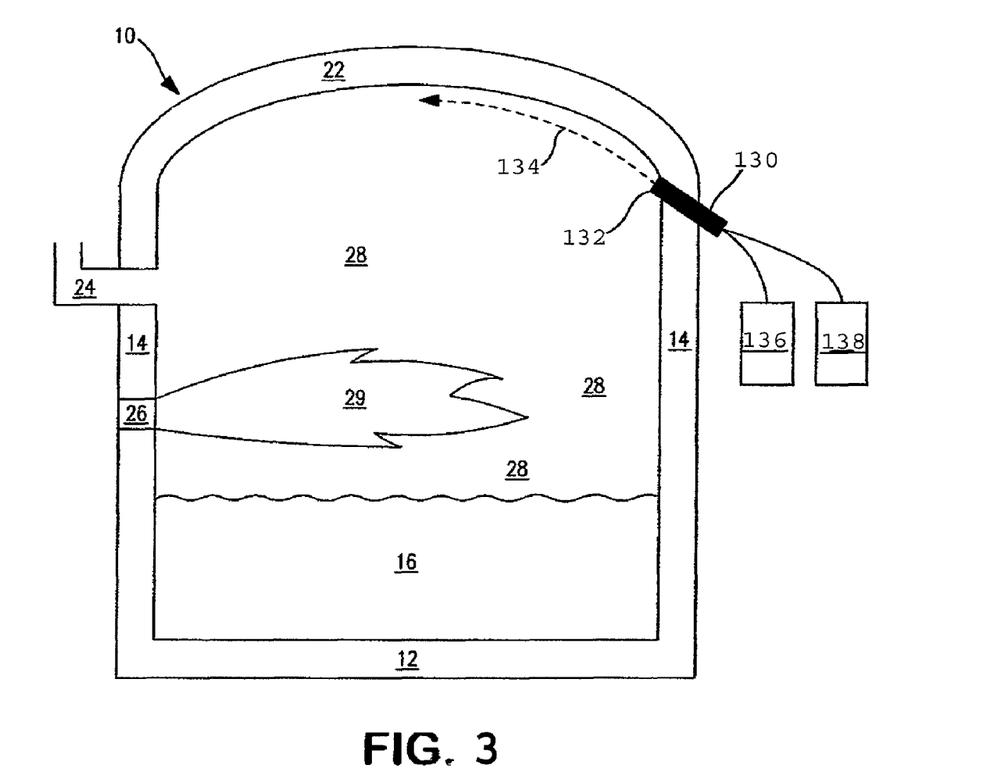
FIG. 3 is a cross-sectional view along the length of a glassmelting furnace in which another embodiment of the present invention can be practiced.

In the practice of another aspect of the present invention, one or more, up to all, of the injectors 30 described above is an oxy-fuel burner, which will be referred to herein as an auxiliary oxy-fuel burner in order to distinguish it from oxy-fuel burners 26. Referring to FIG. 3, in which reference numerals that also appear in FIG. 1 has the same meaning as disclosed above with respect to FIG. 1, reference numeral 130 designates one such auxiliary oxy-fuel burner, although more than one such burner 130 may be provided and employed depending on the size of the furnace 10. Auxiliary oxy-fuel burner 130 is located through a suitably dimensioned hole in a side wall 14. Burner 130 is oriented so that the gaseous combustion products that it produces by combustion at its end 132 flow along the inner surface of crown 22 that faces the interior of furnace 10 (as described above, the inner surface of the crown is considered to be the surface that is otherwise in contact with the furnace atmosphere, whether that surface is comprised of the original material from which the crown was constructed, or is comprised of slag such as is formed upon corrosion by interaction of the furnace atmosphere with the original material from which the inner surface of the crown is constructed). Each oxy-fuel burner 130 is located high on a front, back, or side wall, near or at the intersection of the wall with the crown. Each oxy-fuel burner 130 should be oriented so that combustion products as they emerge from end 132 flow parallel to the portion of the inner crown surface that is closest to the end 132. The flow of the stream of gaseous combustion products from oxy-fuel burner 130 is depicted in FIG. 3 as arrow 134. The gaseous combustion products thus pass between combustion zone 28 and crown 22. Each oxy-fuel burner 130, or at least the portions thereof that are exposed to the high temperatures prevailing within furnace 10, must be made of material that can withstand exposure to such temperatures. Ceramic and high-temperature steel are examples of suitable material. Preferably, the oxy-fuel burner 130 has a discharge end 132 which is configured, or contains a nozzle that is configured, so that the stream of combustion products is discharged in a wide, flat pattern, the better to provide flow of the combustion products along more of the inner surface of the crown.

When using auxiliary oxy-fuel burner 130, fuel from fuel source 136 and oxidant from oxidant source 138 are fed to each of the one or more auxiliary oxy-fuel burners 130 employed in the practice of this invention. The fuel and the oxidant combust at discharge end 132, producing a stream of gaseous combustion products that passes along the inner surface of the crown. The fuel fed to each oxy-fuel burner 130 can be any combustible gaseous or liquid hydrocarbon, preferred examples of which include natural gas and fuel oil. The oxidant fed to this oxy-fuel burner has an oxygen content greater than that of air, preferably at least 50 vol. %, more preferably at least 90 vol. %. The stoichiometric ratio at these burners is preferably greater than 1.0, preferably 1.03 to 5. This is attained in conventional manner, by adjusting the flow rate of the oxidant (taking into account its oxygen concentration) relative to the flow rate of the fuel (taking into account its content of combustible matter).

The stream of combustion products is emitted from burner 130 as a gaseous stream at a low velocity, effective to establish and maintain a layer having the desired high water vapor content as described herein at the inner surface of the crown and permitting the water vapor in that layer to establish the desired equilibrium conditions at the inner surface of the crown. This is quite different from prior art techniques that direct a stream to flow toward the crown surface and to impinge on that surface or on material that is present on that surface. This is also quite different from prior art techniques employing so-called "purge burners" which eject high velocity streams along the crown surface to purge or sweep potentially corrosive gases from reaching the crown surface. That high velocity minimizes or prevents chemical interaction of the crown surface with the streams from the purge burners, whereas the present invention relies on interaction of the crown surface with the combustion products from the oxy-fuel burner or burners 130 and requires low velocity to help attain that interaction.

Practice according to these aspects of the present invention establishes a gaseous layer along the inner surface of the crown that has a water vapor concentration higher than the water vapor concentration of the atmosphere at the surface of the bath of molten glassmaking materials. This difference of water vapor concentrations can be attained in many ways.

One way is to operate the glassmelting burners 26 at stoichiometric conditions at which the stream injected from injector 30 has a higher water vapor content than the water vapor content of the combustion products of the glassmelting burners 26. Yet another way is to operate the glassmelting furnace so that the combustion products of the glassmelting burners are diluted by ambient atmosphere that enters into the furnace, and/or by gas or mixtures containing little or no water vapor that are injected into the combustion zone of the furnace. A preferred way is simply to inject sufficient water vapor (steam) in the stream leaving end 32 so that the stream that flows along the inner surface of the crown has a water vapor concentration high enough to be higher than the water vapor concentration at the surface of the bath of molten glass. In this embodiment, the gaseous stream that flows along the inner surface of the crown can contain water vapor at a concentration of at least 50 vol. %, preferably at least 75 vol. %, or even at least 90 vol. %.

When using one or more oxy-fuel burners 130, one way to attain the desired difference of water vapor concentrations described above is to operate the auxiliary oxy-fuel burners 130 and the glassmelting burners 26 at different stoichiometric conditions, so that the combustion products of the auxiliary burners 130 have a higher water vapor content than the combustion products of the glassmelting burners 26. Another way is to use different fuels, so that the fuel that is combusted at burner(s) 26 has a higher C:H ratio than the fuel that is combusted at burner(s) 130. For instance, the fuel combusted at burner(s) 130 could contain hydrogen, or could even be 100% hydrogen, whereas the fuel combusted at burner(s) 26 could contain amounts up to 100% of coke (such as petroleum coke) having less hydrogen, or even carbon. A preferred way is to operate the glassmelting furnace so that the combustion products of the glassmelting burners are diluted by ambient atmosphere that enters into the furnace, and/or by gas or mixtures containing little or no water vapor that are injected into the combustion of the furnace. Yet another way is to inject water vapor (steam) into the stream of combustion products leaving end 132, or through the auxiliary burner 130, so that the stream that flows along the inner surface of the crown contains water vapor not produced by combustion at the burner 130 in addition to water vapor that is produced by the combustion at the burner 130. In this embodiment, the gaseous stream that flows along the inner surface of the crown can contain water vapor at a concentration of at least 50 vol. %, preferably at least 75 vol. %, or even at least 90 vol. %.

Requiring the water vapor concentration at the crown to be higher than at the bath surface is believed to be surprising, given the understanding in this field that higher rates of crown corrosion are associated with oxy-fuel combustion which is understood to produce more water vapor in its combustion products compared to the combustion products of air-fuel combustion. However, the findings of the present invention indicate that the conditions described herein prevent crown corrosion, and without intending to be bound by any particular theory of how this invention works, these findings are consistent with the following.

Under the temperature conditions established by the combustion at the oxy-fuel glassmelting burner or burners 26, wherein the temperature within the furnace is high enough to maintain the glassmaking materials in a molten condition, the atmosphere within the furnace will contain some vapor-phase alkali hydroxide. The vapor-phase alkali hydroxide is believed to form by so-called reactive volatilization in the glassmelt surface between water vapor in the atmosphere and alkali oxide (e.g. sodium oxide and/or potassium oxide) in the bath. The water vapor is present as a product of combustion at the oxy-fuel burner or burners 26, and as a product of vaporization of water contained in batch materials fed to the furnace. This vapor-phase alkali hydroxide content can be determined by measurement or by computer simulation.

For any given temperature and composition at the crown surface, there is a threshold surface concentration of alkali above which crown corrosion will progress. According to this invention, the alkali concentration in the crown surface is controlled below that threshold concentration by increasing the partial pressure of water vapor near the crown surface. A higher water vapor concentration will shift the equilibrium vapor phase concentration of alkali hydroxide to a higher level for a given alkali concentration in the crown surface. The corrosion rate of the crown material by alkali hydroxide is believed to be proportional to the difference between the partial pressure of the alkali hydroxide in the furnace atmosphere near the inner crown surface, and the alkali hydroxide's equilibrium vapor pressure on the surface. The partial pressures are in turn proportional to the concentrations. Reducing this difference would accordingly reduce the rate of alkali hydroxide transport to the crown material; reducing this difference to zero would eliminate that rate and its concomitant corrosion. And since the alkali hydroxide's equilibrium vapor pressure on the surface is proportional to several factors one of which is the partial pressure of water vapor at that surface, increasing the water vapor concentration at that surface increases the alkali hydroxide's equilibrium vapor pressure at the surface. Doing so will also tend to decrease the aforementioned difference in partial pressures of the alkali hydroxide. Accordingly, increasing the water vapor concentration at the inner crown surface increases the equilibrium alkali hydroxide concentration at the inner crown surface, which is proportional to the square root of the water vapor concentration there. The net result is that providing sufficient water vapor at the inner crown surface to increase the equilibrium alkali hydroxide vapor pressure at the inner crown surface diminishes, or even eliminates, the difference in alkali hydroxide partial pressures which is believed to be the driving force otherwise favoring the corrosive reaction at the inner crown surface. Thus, the present invention achieves the desired control of crown corrosion by chemical interaction, not simply by dilution.

This result would be achieved by injecting from injector 30 a stream that has a high enough water vapor content, and by passing this stream along the inner surface of the crown at a low velocity so that the gaseous stream can flow along the inner crown surface and provide and maintain the desired high concentration of water vapor at that surface. Suitable velocities for the stream as injected from end 32 would be on the order of 0.5 feet per second to 50 feet per second, and preferably 0.5 feet per second to 20 feet per second.

This result would be achieved by carrying out oxy-fuel combustion of fuel and oxidant at burner 130 under conditions that the gaseous combustion products comprise a high enough water vapor content, and by passing these combustion products along the inner surface of the crown at a low velocity so that the gaseous products can flow along the inner crown surface and provide and maintain the desired high concentration of water vapor at that surface. Suitable velocities for the stream of combustion products from the burners 30 would be on the order of 0.5 feet per second to 50 feet per second, and preferably 0.5 feet per second to 20 feet per second.

It can thus also be seen that the method of the present invention is based on retarding or preventing the progress of corrosion. Therefore, the method is preferably operated on a continuous basis, rather than intermittently, as intermittent operation would permit corrosion to reoccur, and would permit slag to recommence forming on the crown surface, and the present invention is based on not permitting either of those events from happening.

It should also be noted that in a preferred embodiment of this invention the stream that is directed to flow along the inner surface of the crown, comprising combustion products from the auxiliary oxy-fuel burner, contains no sodium or other alkali. This is quite different from those prior art techniques that require contacting the crown surface with an alkali-containing stream.

Preferably, the stream of water vapor-containing combustion products emerging from ends 32 reaches all the way across the crown inner surface, but where burners 30 are provided on both sides of the furnace, each should discharge its stream of combustion products so that acting together they cover as much as possible, preferably all, of the inner crown surface. For instance, if burners like burner 30 are positioned on opposing walls, they could discharge their streams of combustion products so that each stream reaches to at least the center of the crown. It is also preferred that the temperature of the stream of combustion products from burner or burners 30 is within about 100 F or less of the temperature of the inner surface of the crown, to minimize temperature stresses.

It has been determined by detailed computer simulation that using a burner such as burner 30 to increase the water vapor concentration at the inner crown surface would impede or cease corrosion of the crown surface. In this simulation, the alkali hydroxide was assumed to be sodium hydroxide. The conditions and results of that simulation are provided in Example 1.

Example 1

This Example describes a simulation of the effect of using the aforementioned oxy-fuel burner (referred to here as "the added burner") to reduce silica crown corrosion of a glassmelting furnace in which the glassmelting heat was provided by oxy-fuel combustion carried out using oxy-fuel burners. The furnace that was modeled was 10.5 m long and 5.4 m wide and had a nominal design pull of 120 tons per day. The original furnace design was not optimized hence heavy corrosion at various parts of the silica crown was observed. Computer models of a glass furnace and of heterogeneous phase equilibriums together with engineering calculations were applied for the analysis, and Table 1 tabulates the results.

Crown corrosion rates were determined at three selected sampling points at the centerline of the furnace crown in the furnace length direction. These sampling points were located at various distances away from the batch charge-end. Lengthwise, the sampling locations were at about 25%, 63%, and 85% of the total furnace length, respectively. The baseline corrosion status, i.e., when the added burner was not used, is listed in Table 1, Part A. Part B of Table 1 lists similar corrosion details at the selected sampling points when the added burner was operating. The following sections describe and compare the corrosion details at the three sampling points.

When the added burner was not operating, gas velocity near the crown at sampling point #1 was calculated to be 0.43 m/sec. The temperature of the furnace gas was calculated to be 1488° C. and to contain 54 wt. % of water vapor and 288 ppm of NaOH vapor. The temperature of the crown surface was calculated to be 1450° C. For a typical silica brick surface layer containing 2.46 weight % of CaO and 1.64 wt. % $Na_2O$, the calculated equilibrium concentration of NaOH vapor was calculated to be 159 ppm on a surface of $SiO_2$—$Na_2O$—CaO slag, i.e. the product of silica crown corrosion, calculated to contain 88% (by weight) of $SiO_2$. Since the calculated concentration of NaOH in the furnace gas (288 ppm) was higher than that of the equilibrium NaOH on the slag surface (159 ppm), there would be a net mass of NaOH being transferred to the silica crown, which would be expected to cause crown corrosion. The rate of this NaOH mass transfer would also be a function of the local Reynolds and Schmidt numbers. The calculated corrosion rate was 2.55 cm/year at this location when the bulk density of the silica brick was assumed to be at a typical value of 1830 kg/m$^3$.

The added burner, which was assumed to be an oxy-fuel burner, was installed near sampling point #1. This burner was assumed to combust natural gas in 99 vol. % purity oxygen to produce gaseous combustion products into which steam was injected, such that the stream fed along the crown surface was assumed to be at a temperature of 1488° C. and to contain 89% of $H_2O$. Assuming that the original furnace gas was mixed with the exhaust of the added burner in equal volumes, the resulting gas mixture would contain 71 wt. % of $H_2O$ and 144 ppm of NaOH vapor. Due to the increase of the water vapor concentration (from 54% original to 71%), the amount of NaOH on the crown surface was calculated to increase to 183 ppm.

Under these conditions, the calculated gas phase NaOH concentration (144 ppm) was lower than the calculated equilibrium NaOH vapor concentration (183 ppm) on the slag surface; therefore, there would be expected a net mass transfer of NaOH from the silica crown. The theoretical crown corrosion rate would thus reduce to zero and the use of the added burner would have prevented silica crown corrosion at sampling point #1.

Table 1 also lists similar details of the corrosion status comparisons for sampling point #2. The calculated corrosion rate at sampling point #2 was extremely high at 10.32 cm/year when the added burner was not used. This high rate of silica crown corrosion was attributed to high NaOH concentration in the furnace gas (calculated to be 316 ppm) and the high weight percentage of $SiO_2$ (calculated to be 95 wt. %) in the slag formed. When an added burner with the listed operating characteristics (i.e., exhaust at 1576° C. and 88% $H_2O$) was assumed to be operating near this sampling point, the calculated $H_2O$ concentration in the furnace gas increased to 73% and correspondingly the calculated NaOH concentration in the furnace gas decreased to 158 ppm. The calculated equilibrium NaOH concentration on the slag surface was 183 ppm. Since the calculated gas-phase NaOH concentration (158 ppm) was lower than the calculated equilibrium NaOH vapor concentration (183 ppm) on the slag surface, there would be no net mass of NaOH transferred to the silica crown. The theoretical crown corrosion rate would also be reduced to zero.

Sampling point #3 was located near the furnace throat-end and beyond the last oxy-fuel fired burner in the furnace length direction. The lack of active burners beyond this point resulted in a very low calculated gas velocity near the crown of 0.09 m/sec. The calculated Reynolds number was 797 indicating a laminar flow regime existed near the crown surface. The calculated crown corrosion rate was 5.14 cm/year despite that the calculated NaOH concentration in the furnace gas was the highest (393 ppm) among the three sampling points. This calculated moderation in silica crown corrosion is believed to be due to the lower NaOH mass transfer coefficient achievable when the furnace gas near the crown is in the laminar flow regime. If an added burner, producing combustion products at 1540 C and containing 88 wt. % of $H_2O$ in the burner exhaust, is added and used near sampling point #3, the calculated $H_2O$ concentration in the furnace gas increases to 73% and correspondingly the calculated NaOH concentration in the furnace gas decreases to 196 ppm. The calculated equilibrium NaOH concentration on the slag surface was 186 ppm. Since the calculated gas-phase NaOH concentration (196 ppm) is slightly higher than the calculated equilibrium NaOH vapor concentration (186 ppm) on the slag surface, there would be expected a net mass of NaOH transferred to the silica crown, causing crown corrosion. The calculated corrosion rate was 0.32 cm/year when this added burner was assumed to be used. Therefore, the use of the added burner would be expected to reduce silica crown loss by 94% at sampling point #3.

TABLE 1

|  |  | Sample point #1 | Sample point #2 | Sample point #3 |
| --- | --- | --- | --- | --- |
| Distance to back wall | (m) | 2.6 | 6.6 | 8.9 |
| Distance as % of furnace length | (%) | 25 | 63 | 85 |
| Part A - without purge burner | | | | |
| Gas Phase Properties near Crown: | | | | |
| Gas velocity at crown surface | (m/sec) | 0.43 | 0.46 | 0.09 |
| Gas temperature near crown | (C.) | 1488 | 1576 | 1540 |

TABLE 1-continued

|  |  | Sample point #1 | Sample point #2 | Sample point #3 |
|---|---|---|---|---|
| H2O concentration in gas | (%) | 54 | 57 | 59 |
| NaOH concentration in gas | (ppmv) | 288 | 316 | 393 |
| Properties of Silica Slag on Crown: |  |  |  |  |
| Crown surface temperature | (C.) | 1450 | 1535 | 1520 |
| Equilibrium NaOH concentration | (ppmv) | 159 | 163 | 167 |
| Weight % of SiO2 in slag | (%) | 88 | 95 | 94 |
| Calculated Silica Crown Corrosion: |  |  |  |  |
| Reynolds number near crown |  | 4461 | 4269 | 797 |
| Schmidt number |  | 0.65 | 0.68 | 0.69 |
| Corrosion rate | (cm/year) | 2.55 | 10.32 | 5.14 |
| Part B - with purge burner |  |  |  |  |
| Properties of purge flame |  |  |  |  |
| Flame temperature | (C.) | 1488 | 1576 | 1540 |
| H2O concentration in purge flame | (%) | 89 | 88 | 88 |
| Gas Phase Properties near Crown: |  |  |  |  |
| purge gas/furnace gas (volume ratio) |  | 1 | 1 | 1 |
| Gas temperature near crown | (C.) | 1488 | 1576 | 1540 |
| Gas velocity at crown surface | (m/sec) | 0.85 | 0.92 | 0.17 |
| H2O concentration in gas | (%) | 71 | 73 | 73 |
| NaOH concentration in gas | (ppmv) | 144 | 158 | 196 |
| Properties of Silica Slag on Crown: |  |  |  |  |
| Crown surface temperature | (C.) | 1450 | 1535 | 1520 |
| Equilibrium NaOH concentration | (ppmv) | 183 | 183 | 186 |
| Weight % of SiO2 in slag | (%) | 88 | 95 | 94 |
| Calculated Silica Crown Corrosion: |  |  |  |  |
| Reynolds number near crown |  | 8922 | 8538 | 1595 |
| Schmidt number |  | 0.65 | 0.68 | 0.69 |
| Corrosion rate | (cm/year) | 0 | 0 | 0.32 |

As indicated above, the applicant has discovered other methods for operating a glassmelting furnace by which corrosion of the crown of the glassmelting furnace is inhibited or lessened.

One method is the aspect mentioned above in which fuel and oxidant having an oxygen content higher than that of air are combusted at said at least one glassmelting burner at a stoichiometric ratio greater than 1.0 to provide heat to said bath, while combusting fuel and oxidant at least one auxiliary burner at a stoichiometric ratio of less than 1.0 to produce a gaseous stream of combustion products comprising carbon monoxide and containing no alkali, and passing said gaseous stream of combustion products along said inner surface of said crown to establish and maintain a layer of said combustion products flowing along said inner surface which interact with alkali species from said combustion zone which are thereby inhibited from reacting with said inner surface of said crown.

Figure 4:
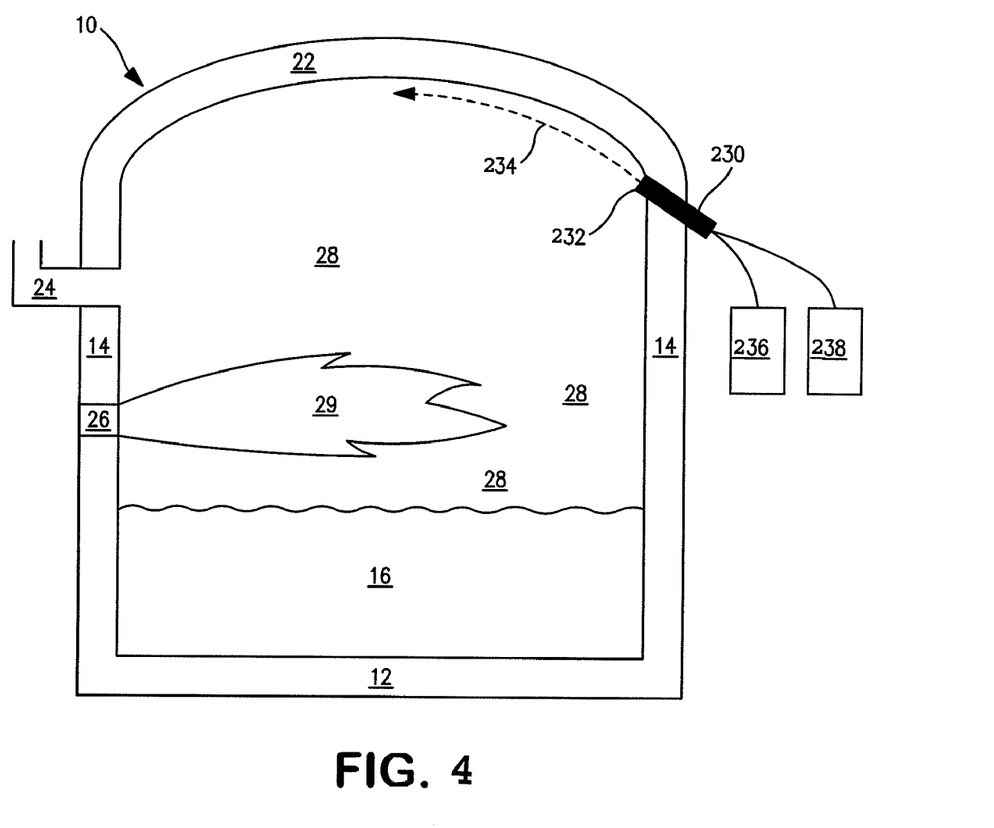
FIG. 4 is a cross-sectional view along the length of a glassmelting furnace in which another embodiment of the present invention can be practiced.

This aspect can be carried out in a glassmelting furnace such as the furnace illustrated in FIG. 4, in which reference numeral that also appear in FIG. 1 have the same meaning as disclosed above with respect to FIG. 1.

This aspect of the invention can be carried out in a glassmelting furnace 10 of any effective design. Typically the glassmelting furnace has a bottom 12 and walls 14 which define in the interior of the furnace a chamber for holding a bath 16 of glassmaking materials. Typically, at least a portion of the glassmaking materials in the bath are molten. That is, "glassmelting furnace" in which the present invention can be practiced includes apparatus in which glassmaking materials are melted, and includes apparatus (or sections of glassmelting apparatus, sometimes referred to as conditioning or refining zones) which holds already-molten glassmaking materials without necessarily performing any further melting.

The particular shape of the bottom is not critical, although in general practice it is preferred that at least a portion of the bottom is planar and is either horizontal or sloped in the direction of the flow of the molten glass through the furnace. All or a portion of the bottom can instead be curved. The particular shape of the furnace as defined by its walls is also not critical, so long as the walls are high enough to hold the desired amount of molten glass and to provide with the crown space above the molten glass in which the combustion can occur that melts the glassmaking materials and keeps them molten.

As seen better in FIG. 2, the furnace 10 also has an entrance 18, typically in a back wall 13 at an end of the furnace through which glassmaking materials or molten glass flows into the furnace, and an exit 20, typically in a front wall 15 at an end of the furnace opposite front wall 13 through which molten glass can flow out of the furnace. The furnace will also have side walls 14 and a roof, referred to herein as the crown 22. There are also one or more flues 24 through which products of the combustion of fuel and oxygen can flow out of the interior of the furnace. The flue or flues are typically located in back wall 13, or in one or more side walls.

The bottom, sides and crown of the furnace should be made from refractory material that can retain its solid structural integrity at the temperatures to which it will be exposed, i.e. typically 1300° C. to 1700° C. Such materials are widely known in the field of construction of high-temperature apparatus. Examples include silica, fused alumina, and AZS.

The inner surface of the crown, i.e. the surface that is in contact with the furnace atmosphere, may be comprised of the original material of construction of the crown, and in some places may instead comprise a layer of slag that has formed on what was the uncorroded surface of the crown. Such a slag layer may often be found in furnaces that have already been in use, particularly when such furnaces have been heated by oxy-fuel combustion. Typically, the slag layer contains silica, alkali oxide, alkaline earth oxide, and compounds thereof, such as contain calcium oxide and/or compounds of calcium oxide with silica and/or alkali oxide. Thus, the present invention can be carried out in furnaces in which the inner surface of the crown comprises corrosion product formed by reaction of the surface with alkali hydroxide, and in furnaces in which the inner surface of the crown does not comprise corrosion product formed by reaction of the surface with alkali hydroxide.

Referring again to FIG. 2, the glassmaking furnace 10 is also equipped with one or more glassmelting burners 26. Preferably, one or more of glassmelting burners 26 are oxy-fuel burners, that is, burners at which the combustion that occurs is oxy-fuel combustion. More preferably, for ease of construction, ease of operation and satisfactory control of the operations, all of the burners 26 are oxy-fuel burners. However, if desired, air-fired burners can be present as well.

Each glassmelting burner 26 is arranged so that oxidant and fuel are fed from suitable sources outside the furnace, into and through the burner so that fuel and oxidant emerge from the burner (separately or mixed) and combust in the interior of the furnace and generate heat to melt the glassmaking materials and maintain the glassmelt in the molten state.

The oxidant fed to the oxy-fuel burners is gaseous and should have a higher oxygen content than air, i.e. higher than 21 volume percent, but the preferred oxygen content of the oxidant is at least 50 volume percent and more preferably at least 90 volume percent. Thus, oxygen-enriched air can be employed as the oxidant, as can higher purity oxygen produced on site or purchased from a commercial supplier. The fuel fed to the burners should contain carbon, hydrocarbons or other compounds containing hydrogen and/or carbon. Suitable fuels include those conventionally used for these purposes such as natural gas, fuel oil, pulverized coal or petroleum coke. The stoichiometric ratio at these burners is preferably greater than 1.0, preferably 1.03 to 5; that is, there is preferably excess oxygen which may be present in the combustion zone atmosphere.

The glassmelting burners 26 are arranged so that the combustion of the fuel and oxidant fed to the burner occurs in a combustion zone 28 which includes flame(s) 29, in the interior of the furnace, above the surface of the bath 16 of melting or molten glassmaking materials and below crown 22. Typically the burners 26 can be located in one or more walls of the furnace (by which is meant side walls 14, back wall 13, and/or front wall 15). Burners 26 can be oriented so that the axes of the flames they support extend inward parallel to the surface of the molten glass, or so that the flames extend from the burner in a direction toward the surface of the molten glass. Combinations of different orientations can also be employed. Preferred examples include providing equal numbers of burners 26 in each of the side walls of a furnace, facing each other or staggered. The burners 26 can all be at the same height above the top surface of the bath 16, or the heights can be varied to provide a different distribution of the heat of combustion.

The glassmelting furnace can also include a section in which there is no glassmelting burner 26 above the bath, wherein the molten glass is maintained in the molten state by the heat within the chamber.

In the practice of this aspect of the present invention, at least one auxiliary burner 230 is provided and used as described below. Each auxiliary burner 230 can be an oxy-fuel burner, at which oxy-fuel combustion is carried out as described herein, or an air-fuel burner at which fuel is combusted with air. Oxy-fuel burners are preferred. Also, where more than one auxiliary burner 230 is employed, some may be oxy-fuel burners while others are air-fuel burners.

One such auxiliary burner 230 is shown in FIG. 4, but more than one such burner 230 may be provided and employed depending on the size of the furnace 10. As shown in FIG. 4, auxiliary burner 230 is located through a suitably dimensioned hole in a side wall 14. Burner 230 is oriented so that the gaseous combustion products that it produces by combustion at its end 232 flow along the inner surface of crown 22 that faces the interior of furnace 10 (as described above, the inner surface of the crown is considered to be the surface that is otherwise in contact with the furnace atmosphere, whether that surface is comprised of the original material from which the crown was constructed, or is comprised of slag such as is formed upon corrosion by interaction of the furnace atmosphere with the original material from which the inner surface of the crown is constructed). Each auxiliary burner 230 is located high on a front, back, or side wall, near or at the intersection of the wall with the crown. Each auxiliary burner 230 should be oriented so that combustion products as they emerge from end 232 flow parallel to the portion of the inner crown surface that is closest to the end 232. The flow of the stream of gaseous combustion products from burner 230 is depicted in FIG. 4 as arrow 234. The gaseous combustion products thus pass between combustion zone 28 and crown 22. Each auxiliary burner 230, or at least the portions thereof that are exposed to the high temperatures prevailing within furnace 10, must be made of material that can withstand exposure to such temperatures. Ceramic and high-temperature steel are examples of suitable material. Preferably, burner 230 has a discharge end 232 which is configured, or contains a nozzle that is configured, so that the stream of combustion products is discharged in a wide, flat pattern, the better to provide flow of the combustion products along more of the inner surface of the crown.

Fuel from fuel source 236 and oxidant from oxidant source 238 are fed to each auxiliary burner 230 employed in the practice of this aspect of the invention. The fuel and the oxidant combust at discharge end 232, producing a stream of gaseous combustion products that passes along the inner surface of the crown. The fuel fed to each burner 230 can be any combustible gaseous or liquid hydrocarbon, preferred examples of which include natural gas and fuel oil. The oxidant fed to an oxy-fuel auxiliary burner has an oxygen content greater than that of air, preferably at least 50 vol. %, more preferably at least 90 vol. %. The oxidant fed to an air-fuel burner is air. The stoichiometric ratio at each auxiliary burner 230 is less than 1.0, preferably 0.75 to 0.95. This is attained in conventional manner, by adjusting the flow rate of the oxidant (taking into account its oxygen concentration) relative to the flow rate of the fuel (taking into account its content of combustible matter).

The combustion at a stoichiometric ratio less than 1.0 produces a gaseous stream of combustion products that includes products of incomplete combustion, including carbon monoxide. The incompletely reacted products establish that the gaseous stream is a reducing atmosphere. This stream of combustion products is emitted from burner 30 as a gaseous stream at a low velocity, effective to establish and maintain a gaseous layer at the inner surface of the crown and establishing the reducing conditions in that layer between the combustion zone and the inner surface of the crown. This is quite different from prior art techniques that direct a stream to flow toward the crown surface and to impinge on that surface or on material that is present on that surface. This is also quite different from prior art techniques employing so-called "purge burners" which eject high velocity streams along the crown surface to purge or sweep potentially corrosive gases from reaching the crown surface. That high velocity minimizes or prevents chemical interaction of reactants with the streams from the purge burners, whereas the present invention relies on interaction of alkali species in the combustion zone atmosphere with the combustion products from the burner or burners 30 and requires low velocity to help attain that interaction.

The practice according to this aspect of the present invention establishes a gaseous layer along the inner surface of the crown that is a reducing atmosphere. The reducing atmosphere should contain a sufficient concentration of oxidizable species to interact with alkali species from the combustion zone and inhibit or even completely prevent alkali species from reaching and reacting with the inner surface of the crown. This interaction in the reducing atmosphere that is established by the fuel-rich combustion at the at least one burner 230 is believed to reduce oxidic alkali species in the atmosphere to fully reduced metallic sodium and potassium. These, in turn, pass to other areas of the glassmelting furnace and to a flue of the furnace, where they encounter gases usually containing oxygen (in the products of the combustion at the glassmelting burners 26) and sulfur dioxide (produced from the glassmelt). These gases react with the metallic sodium and potassium to form alkali oxides and sulfates which exit the glassmelting furnace in the flue gas rather than becoming deposited onto the crown.

Requiring the formation of a layer of a gaseous reducing atmosphere at the crown surface is believed to be surprising, given the teachings in the aforementioned U.S. Pat. No. 3,238,030 and U.S. Pat. No. 3,240,581 which use a reducing atmosphere, and which even add extra alkali, to form ever-increasing amounts of alkali silicate onto the crown surface. However, the present invention differs significantly in that it uses a reducing atmosphere to impede and even prevent formation of alkali compounds onto the crown surface.

The method of the present invention is expected to inhibit and even prevent formation of alkali compounds onto the crown surface by removing a reactant necessary for that formation. Under the temperature conditions established by the combustion at the oxy-fuel glassmelting burner or burners 26, wherein the temperature within the furnace is high enough to maintain the glassmaking materials in a molten condition, the atmosphere within the furnace will contain some vapor-phase alkali species (such as alkali hydroxide, and referred to here as such). The vapor-phase alkali hydroxide is believed to form by so-called reactive volatilization in the glassmelt surface between water vapor in the atmosphere and alkali oxide (e.g. sodium oxide and/or potassium oxide) in the bath. The water vapor is present as a product of combustion at the oxy-fuel burner or burners 26, and as a product of vaporization of water contained in batch materials fed to the furnace. This vapor-phase alkali hydroxide content can be determined by measurement or by computer simulation.

The corrosive reaction of the crown material with alkali hydroxide (or other alkali species) is believed to require the alkali species to react with that surface. The method of the present invention inhibits the formation of alkali compounds in that surface by shifting the chemical equilibrium conditions between alkali species in the furnace atmosphere and the surface of the crown material. Thus, the present invention achieves the desired inhibition of crown corrosion by chemical interaction, not simply by dilution.

This result would be achieved by carrying out fuel-rich combustion of fuel and oxidant at burner 230 under conditions such that the gaseous combustion products form a reducing atmosphere, and by passing these combustion products along the inner surface of the crown at a low velocity so that the gaseous products can flow along the inner crown surface and provide and maintain the desired reducing atmosphere at that surface. Suitable velocities for the stream of combustion products from the burner 30 would be on the order of 0.5 feet per second to 50 feet per second, and preferably 0.5 feet per second to 20 feet per second.

It can thus also be seen that the method of the present invention is based on retarding or preventing the progress of corrosion. Therefore, the method is operated on a continuous basis, rather than intermittently, as intermittent operation would permit corrosion to reoccur, and would permit slag or reactive precursors of slag (such as sodium sulfate or sodium sulfite) to recommence forming on the crown surface, and the present invention is based on not permitting any of those events from happening.

It should also be noted that in this aspect of the invention the stream that is directed to flow along the inner surface of the crown, comprising combustion products from the auxiliary burner, contains no sodium or other alkali. This is quite different from those prior art techniques that require contacting the crown surface with an alkali-containing stream.

Preferably, the stream of combustion products emerging from ends 232 reaches all the way across the crown inner surface, but where burners 230 are provided on both sides of the furnace, each should discharge its stream of combustion products so that acting together they cover as much as possible, preferably all, of the inner crown surface. For instance, if burners like burner 230 are positioned on opposing walls, they could discharge their streams of combustion products so that each stream reaches to at least the center of the crown. It is also preferred that the temperature of the stream of combustion products from burner or burners 230 is within about 100 F or less of the temperature of the inner surface of the crown, to minimize temperature stresses.

The applicant has discovered yet another method of operating a glassmelting furnace by which corrosion of the crown of the glassmelting furnace is inhibited or lessened. This method is the aspect mentioned above in which fuel and oxidant having an oxygen content higher than that of air are combusted at said at least one glassmelting burner at a stoichiometric ratio greater than 1.0 to provide heat to said bath, while injecting into said chamber a gaseous reactant, containing no alkali, which reacts with alkali species in said chamber which are thereby inhibited from reacting with said inner surface of said crown.

Figure 5:
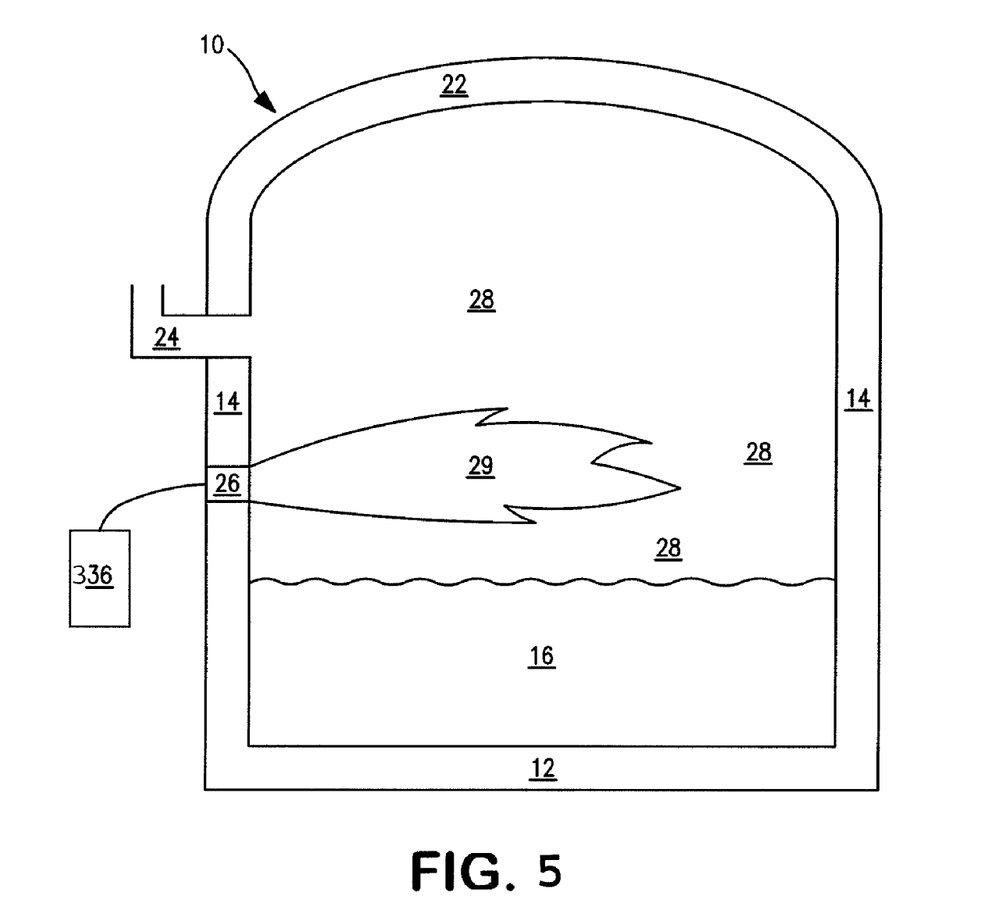
FIG. 5 is a cross-sectional view along the length of a glassmelting furnace in which another embodiment of the present invention can be practiced.
Figure 6:
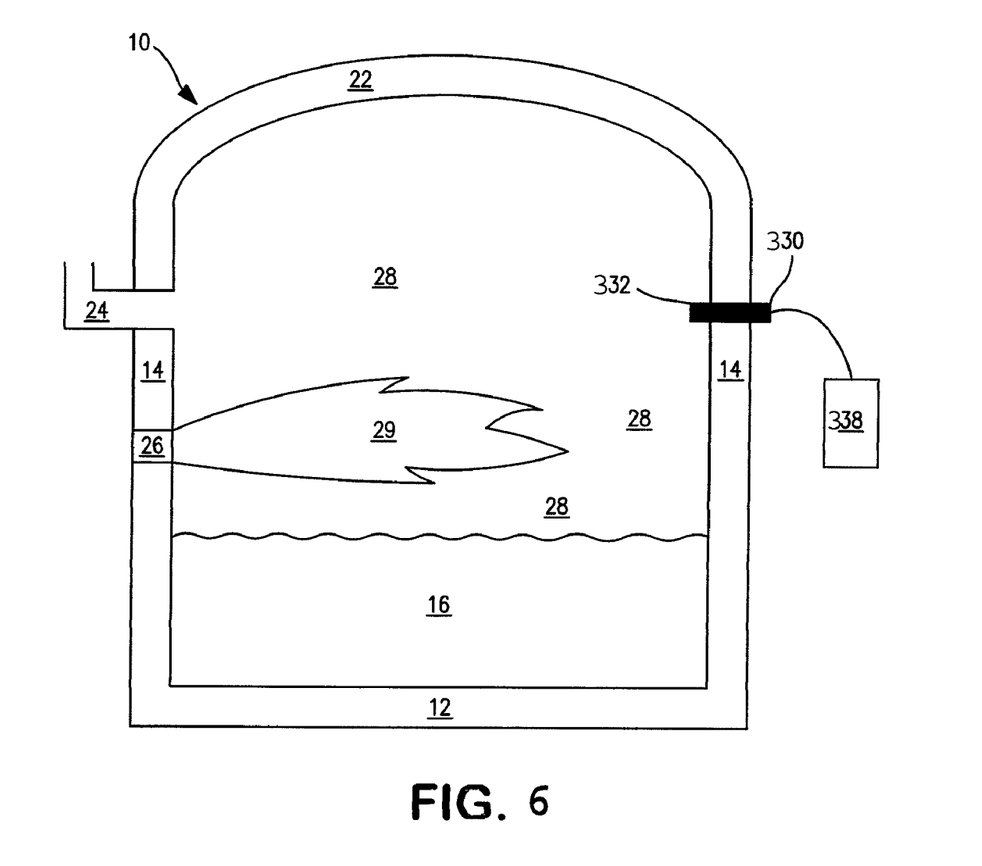
FIG. 6 is a cross-sectional view along the length of a glassmelting furnace in which another embodiment of the present invention can be practiced.

This aspect can be carried out in glassmelting furnace such as the furnace illustrated in FIGS. 5 and 6, in which reference numerals that also appear in FIG. 1 have the same meaning as disclosed above with respect to FIG. 1.

This aspect of the invention can be carried out in a glassmelting furnace 10 of any effective design. Typically the glassmelting furnace has a bottom 12 and walls 14 which define in the interior of the furnace a chamber for holding a bath 16 of glassmaking materials. Typically, at least a portion of the glassmaking materials in the bath are molten. That is, "glassmelting furnace" in which the present invention can be practiced includes apparatus in which glassmaking materials are melted, and includes apparatus (or sections of glassmelting apparatus, sometimes referred to as conditioning or refining zones) which holds already-molten glassmaking materials without necessarily performing any further melting.

The particular shape of the bottom is not critical, although in general practice it is preferred that at least a portion of the bottom is planar and is either horizontal or sloped in the direction of the flow of the molten glass through the furnace. All or a portion of the bottom can instead be curved. The particular shape of the furnace as defined by its walls is also not critical, so long as the walls are high enough to hold the desired amount of molten glass and to provide with the crown space above the molten glass in which the combustion can occur that melts the glassmaking materials and keeps them molten.

As seen better in FIG. 2, the furnace 10 also has an entrance 18, typically in a back wall 13 at an end of the furnace through which glassmaking materials or molten glass flows into the furnace, and an exit 20, typically in a front wall 15 at an end of the furnace opposite front wall 13 through which molten glass can flow out of the furnace. The furnace will also have side walls 14 and a roof, referred to herein as the crown 22. There are also one or more flues 24 through which products of the combustion of fuel and oxygen can flow out of the interior of the furnace. The flue or flues are typically located in back wall 13, or in one or more side walls.

The bottom, sides and crown of the furnace should be made from refractory material that can retain its solid structural integrity at the temperatures to which it will be exposed, i.e. typically 1300° C. to 1700° C. Such materials are widely known in the field of construction of high-temperature apparatus. Examples include silica, fused alumina, and AZS.

The inner surface of the crown, i.e. the surface that is in contact with the furnace atmosphere, may be comprised of the original material of construction of the crown, and in some places may instead comprise a layer of slag that has formed on what was the uncorroded surface of the crown. Such a slag layer may often be found in furnaces that have already been in use, particularly when such furnaces have been heated by oxy-fuel combustion. Typically, the slag layer contains silica, alkali oxide, alkaline earth oxide, and compounds thereof, such as contain calcium oxide and/or compounds of calcium oxide with silica and/or alkali oxide. Thus, the present invention can be carried out in furnaces in which the inner surface of the crown comprises corrosion product formed by reaction of the surface with alkali hydroxide, and in furnaces in which the inner surface of the crown does not comprise corrosion product formed by reaction of the surface with alkali hydroxide.

Referring again to FIG. 2, the glassmaking furnace 10 is also equipped with one or more glassmelting burners 26. Preferably, one or more of glassmelting burners 26 are oxy-fuel burners, that is, burners at which the combustion that occurs is oxy-fuel combustion. More preferably, for ease of construction, ease of operation and satisfactory control of the operations, all of the burners 26 are oxy-fuel burners. However, if desired, air-fired burners can be present as well.

Each glassmelting burner 26 is arranged so that oxidant and fuel are fed from suitable sources outside the furnace, into and through the burner so that fuel and oxidant emerge from the burner (separately or mixed) and combust in the interior of the furnace and generate heat to melt the glassmaking materials and maintain the glassmelt in the molten state.

The oxidant fed to the oxy-fuel burners is gaseous and should have a higher oxygen content than air, i.e. higher than 21 volume percent, but the preferred oxygen content of the oxidant is at least 50 volume percent and more preferably at least 90 volume percent. Thus, oxygen-enriched air can be employed as the oxidant, as can higher purity oxygen produced on site or purchased from a commercial supplier. The fuel fed to the burners should contain carbon, hydrocarbons or other compounds containing hydrogen and/or carbon. Suitable fuels include those conventionally used for these purposes such as natural gas, fuel oil, pulverized coal or petroleum coke. The stoichiometric ratio at these burners is preferably greater than 1.0, preferably 1.03 to 5; that is, there is preferably excess oxygen which may be present in the combustion zone atmosphere. This is attained in conventional manner, by adjusting the flow rate of the oxidant (taking into account its oxygen concentration) relative to the flow rate of the fuel (taking into account its content of combustible matter).

The glassmelting burners 26 are arranged so that the combustion of the fuel and oxidant fed to the burner occurs in a combustion zone 28 which includes flame(s) 29, in the interior of the furnace, above the surface of the bath 16 of melting or molten glassmaking materials and below crown 22. Typically the burners 26 can be located in one or more walls of the furnace (by which is meant side walls 14, back wall 13, and/or front wall 15). Burners 26 can be oriented so that the axes of the flames they support extend inward parallel to the surface of the molten glass, or so that the flames extend from the burner in a direction toward the surface of the molten glass. Combinations of different orientations can also be employed. Preferred examples include providing equal numbers of burners 26 in each of the side walls of a furnace, facing each other or staggered. The burners 26 can all be at the same height above the top surface of the bath 16, or the heights can be varied to provide a different distribution of the heat of combustion.

The glassmelting furnace can also include a section in which there is no glassmelting burner 26 above the bath, wherein the molten glass is maintained in the molten state by the heat within the chamber.

The practice according to this aspect of the present invention injects into the furnace atmosphere a reactant which reacts with alkali species in that atmosphere to form a reaction product that is less reactive, than the alkali species, with the material of the crown surface. Preferably also, the reaction product is also volatile enough that it stays in the gas phase and leaves the furnace in the flue gas. The amount of the reactant injected should provide a sufficient concentration of the reactant to react with alkali species in the combustion zone and prevent alkali species from reaching and interacting with the inner surface of the crown.

A sufficient amount of reactant should be injected to react with alkali species in the chamber and inhibit or even completely prevent alkali species from reaching and reacting with the inner surface of the crown. This reaction with the alkali species forms a reaction product that is stable and volatile at the temperatures encountered in the chamber. The reaction product, in turn, passes to other areas of the glassmelting furnace and to a flue of the furnace, where it exits the furnace in the flue gas rather than interacting with the crown such as by reacting with material on the crown surface.

Suitable reactants need to be able to react with alkali species at the temperatures, generally above 1000° C., encountered within a glassmelting furnace. The reactant must also react with alkali species at such temperatures to form a product that is less reactive, or unreactive, with the material at the surface of the crown.

A preferred reactant is $B(OH)_3$. This is believed to react with alkali species in the furnace atmosphere to form $NaBO_2$ and $KBO_2$ which then leave the furnace in the flue gas, rather than reacting with the crown surface.

One way to inject the reactant into the furnace chamber is to inject it at one or more of the glassmelting burners 26, either through a suitable port in the burner or premixed with oxidant and/or fuel that is fed to the burner. In this embodiment, a product comprising the reactant to be injected into the furnace is fed from source 336 to burner 26. The reactant can be provided in this embodiment as a solution or suspension in an appropriate solvent or vehicle that is inert to the reactant, or the reactant can be provided in a form without solvent or vehicle. Depending on the amount of the reactant to be injected, and on its reactivity, providing it in a mixture with oxidant or fuel and without any liquid solvent or vehicle is generally preferred to facilitate dispensing of controlled amounts of the reactant, without having to adjust the feeds of fuel and oxidant to the burner to provide heat of vaporization.

An alternate embodiment of the present invention is illustrated in FIG. 6. In this embodiment, at least one injector is provided and used as described below. One such injector 330 is shown in FIG. 6, but more than one such injector 330 may be provided and employed depending on the size of the furnace 10. As shown in FIG. 6, injector 330 is located through a suitably dimensioned hole in a side wall 14. Instead, or in addition, injectors of this type can be provided in front and/or back walls as well. Each injector 330 is oriented so that the stream that it injects passes into the chamber in furnace 10 between the top surface of bath 16 and the crown 22. Each injector 330, or at least the portions thereof that are exposed to the high temperatures prevailing within furnace 10, must be made of material that can withstand exposure to such temperatures. Ceramic and high-temperature steel are examples of suitable material. Preferably, each injector 330 has a discharge end 332 which is configured, or contains a nozzle that is configured, so that the stream is discharged in a wide, flat pattern, the better to provide increased contact with the other constituents of the furnace atmosphere The product to be injected into the furnace, comprising the reactant, is fed from source 338 to injector 330. The reactant can be provided in this embodiment as a solution or suspension in an appropriate solvent or vehicle that is inert to the reactant, or the reactant can be provided in a form without solvent or vehicle. Depending on the amount of the reactant to be injected, and on its reactivity, providing it in a mixture with solvent or vehicle is generally preferred to facilitate dispensing of controlled amounts of the reactant.

This method of the present invention is expected to inhibit and even prevent formation of alkali compounds onto the crown surface by removing a reactant necessary for that formation. Under the temperature conditions established by the combustion at the oxy-fuel glassmelting burner or burners 26, wherein the temperature within the furnace is high enough to maintain the glassmaking materials in a molten condition, the atmosphere within the furnace will contain some vapor-phase alkali species (such as alkali hydroxide, and referred to here as such). The vapor-phase alkali hydroxide is believed to form by so-called reactive volatilization in the glassmelt surface between water vapor in the atmosphere and alkali oxide (e.g. sodium oxide and/or potassium oxide) in the bath. The water vapor is present as a product of combustion at the oxy-fuel burner or burners 26, and as a product of vaporization of water contained in batch materials fed to the furnace. This vapor-phase alkali hydroxide content can be determined by measurement or by computer simulation.

The corrosive reaction of the crown material with alkali hydroxide (or other alkali species) is believed to require the alkali species to reach that surface. The method of the present invention removes that alkali species before it reaches that surface. Thus, the present invention achieves the desired control of crown corrosion by chemical interaction, not simply by dilution.

It can thus also be seen that the method of the present invention is based on retarding or preventing the progress of corrosion. Therefore, the method is operated on a continuous basis, rather than intermittently, as intermittent operation would permit corrosion to reoccur, and would permit slag or reactive precursors of slag (such as sodium sulfate or sodium sulfite) to recommence forming on the crown surface, and the present invention is based on not permitting any of those events from happening.

It should also be noted that in this invention the reactant that is injected into the furnace atmosphere contains no sodium or other alkali. This is quite different from those prior art techniques that require contacting the crown surface with an alkali-containing stream.

Preferably, the reactant is injected in a wide pattern, the better to provide the opportunity for the reactant to encounter alkali species in the furnace atmosphere. Also, the interaction of reactant and alkali species would be improved with increasing distance of penetration of the flow of the reactant stream into the furnace chamber from the point or points from which it is injected.

What is claimed is:

1. A method of operating a glassmelting furnace, comprising
   (A) providing a glassmelting furnace having walls defining a chamber that encloses a bath comprising glassmaking materials, a crown over said bath, at least one glassmelting oxy-fuel burner through a wall to provide heat to said bath by combustion in a combustion zone that is located between said bath and said crown, wherein the atmosphere within said glassmelting furnace contains vapor-phase alkali species and the inner surface of said crown is susceptible to corrosion by reaction with said vapor-phase alkali species, and at least one injector through a wall of said furnace that is oriented to inject a gaseous reactant into the space between the combustion zone and the inner surface of said crown, and
   (B) combusting fuel and oxidant having an oxygen content higher than that of air at said at least one glassmelting burner at a stoichiometric ratio greater than 1.0 to provide heat to said bath, while injecting from said at least one injector into said space a gaseous reactant, containing no alkali, which reacts with alkali species in said space which are thereby inhibited from reacting with said inner surface of said crown.

2. A method according to claim 1 wherein said reactant is injected into said chamber through one or more of said glassmelting burners.

3. A method according to claim 1 wherein said reactant is injected into said chamber through a wall of said furnace.

4. A method according to claim 1 wherein said reactant is $B(OH)_3$.

5. A method according to claim 4 wherein said reactant is injected into said chamber through one or more of said glassmelting burners.

6. A method according to claim 4 wherein said reactant is injected into said chamber through a wall of said furnace.

* * * * *